March 31, 1931.   L. N. DREIBELBIS   1,798,195
SOLDERING TORCH
Filed Oct. 9, 1928

INVENTOR:—
LYLE N. DREIBELBIS.
By Martin P. Smith, Atty.

Patented Mar. 31, 1931

1,798,195

UNITED STATES PATENT OFFICE

LYLE N. DREIBELBIS, OF LOS ANGELES, CALIFORNIA

SOLDERING TORCH

Application filed October 9, 1928. Serial No. 311,328.

My invention relates to a soldering torch that is especially designed for use in the repair of automobile radiators, and the principal objects of my invention are to generally improve upon and simplify the construction of the existing forms of soldering torches and to provide a relatively simple, practical and inexpensive torch that will be effective in producing a thorough mixture of combustible gas and oxygen to produce a high temperature flame that is especially applicable for use in soldering operations.

Further objects of my invention are to provide a torch of the character referred to that is constructed so as to effectively prevent back flash or back fires, further to provide a torch that is relatively simple in construction, capable of being readily assembled or taken apart, and, further, to provide a torch having a removable tip or nozzle that is constructed so that the oxygen passing through said tip forms an annular cushion for the gas issuing from the jet orifice, with the result that a perfect mixture of the gas and oxygen is obtained with a consequent production of the much desired long blue cone of flame as it ignites at the jet orifice of the centrally arranged tube.

A further object of my invention is to provide a soldering torch that will produce a relatively long slender flame of high temperature, and which is small in diameter in order that it will readily penetrate the cores or cells of the ordinary automobile radiator.

With the foregoing and other objects in view, my invention consists in certain novel features of construction and arrangement of parts that will hereinafter be more fully described and claimed and illustrated in the accompanying drawing, in which:—

Figure 1:
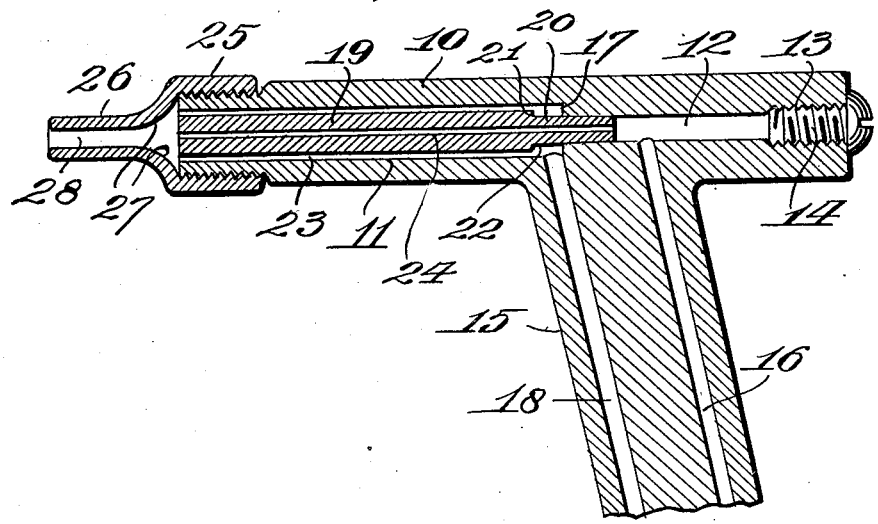
Fig. 1 is a longitudinal section taken through the center of a torch of my improved construction.

Referring by numerals to the accompanying drawings, 10 designates a cylindrical member that forms the body of the torch, and formed through the forward portion of said body is an axial bore 11, the rear end of which communicates with a smaller axial bore 12 that extends through the rear portion of said body 10.

Formed in the rear end of the body 10 is a threaded aperture 13 that receives the shank of a screw 14, which latter functions as a closure for the rear end of the bore 12, and by removing the screw 14 the bores 11 and 12 may be cleaned in the event that it becomes necessary.

Formed integral with or fixed to the rear portion of body 10 is a depending member 15 that functions as a handle in the manipulation of the torch, and formed through this handle is a duct 16 that communicates with the bore 12 at a point a short distance to the rear of the shoulder 17 that is formed between the bores 11 and 12. Duct 16 is for the purpose of conveying a suitable combustible gas to the torch, and the lower end of the duct may be connected in any suitable manner to a source of gas supply, preferably a tank.

Formed through the front portion of the handle 15 is a duct 18 that is connected to a suitable source of oxygen supply and the upper end of this duct communicates with the rear end of the bore 11 that extends through the forward portion of body 10.

Concentrically arranged within the bore 11 is a cylindrical member 19 and the rear end of this member is reduced in diameter, as designated by 20, and said reduced rear end portion is pressed or driven into the forward portion of the bore 12.

A shoulder 21 is formed between the reduced rear end portion 20 and the body of said member 19, thereby providing an annular chamber 22 between the shoulders 17 and 21, and which annular chamber communicates with the end of duct 18. Chamber 22 also communicates with the relatively narrow chamber 23 that surrounds the cylindrical member 19.

The forward end of member 19 terminates at or near the forward end of the body 10 and formed through said member 19 and the reduced rear end portion 20 thereof is a relatively small axially disposed duct 24 that communicates with the bore or passageway 12 in the rear portion of the torch body.

Screw seated on the forward portion of the torch body 10 is a tubular tip 25, the forward portion 26 thereof being material reduced in diameter and formed on the interior of this tip between the body portion 25 and the reduced forward end portion 26 is an annular shoulder 27 that is rounded or convex in cross section.

The opening 28 through the reduced forward portion 26 of the tip is in direct or axial alinement with and slightly larger in diameter than the axial bore 24 through member 19.

In the use of my improved torch, a combustible gas is permitted to flow through duct 16 to discharge into bore 12, and thence flow forwardly through axial bore 24 and simultaneously oxygen is permitted to flow through duct 18 into chamber 22 and from the latter the oxygen flows forwardly through the narrow space 23 that surrounds tubular member 19.

By providing the chamber 22 at the discharge end of duct 18 the oxygen will completely fill the chamber 22 and pass therefrom through the narrow annular chamber 23, so as to produce a circular wall of oxygen that entirely surrounds the jet of gas as said oxygen and gas discharge from their respective ducts into the tip at the forward end of the torch body.

Figure 2:
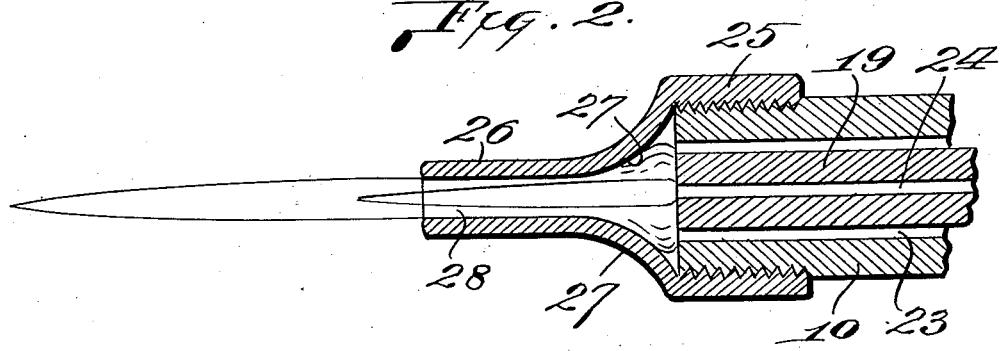
Fig. 2 is an enlarged section through the burner tip and showing the annular cushion produced by the oxygen around the cone of gas at the point of discharge thereof into said burner tip.

The annular wall or sheet of oxygen in discharging from the forward end of the annular space 23 will strike against the curved or convex shoulder 27 within the tip, thereby forming an annular cushion that entirely surrounds the forward end of the gaseous duct 24, with the result that a thorough mixture of the gas and oxygen is produced within the tip and the jet of gas issuing from the forward end of the duct 24 will take the form of an elongated needle pointed cone which passes through the reduced tubular forward end of the tip, as illustrated in Fig. 2.

The mixture of the oxygen with the gas produces an elongated needle pointed flame that discharges from the reduced forward portion of the tip 26, as illustrated in Fig. 2, and such flame may be advantageously employed in carrying out soldering operations in relatively small recesses or pockets, for instance the cells or cores of the ordinary automobile radiator.

In the event that it becomes necessary to remove the tubular member 19 from the torch body, tip 25 is removed from the forward end of said body and after removing screw 14 a punch of small diameter is introduced into the bore 12 to engage and drive outwardly the member 19.

Thus it will be seen that I have provided a soldering torch that is relatively simple in construction, inexpensive of manufacture, and very effective in performing the functions for which it is intended.

It will be understood that minor changes in the size, form and construction of the various parts of my improved soldering torch may be made and substituted for those herein shown and described without departing from the spirit of my invention, the scope of which is set forth in the appended claims.

I claim as my invention:

1. In a soldering torch, a body provided with an axially disposed bore, the rear portion of which is reduced in diameter, a tubular member occupying the enlarged portion of the bore in the body of the torch the rear end portion of which tubular member is reduced in diameter and the rear end of said reduced portion being seated in the reduced rear portion of said bore there being a shoulder formed between the larger portion of said tubular member and the reduced rear end portion, a gas duct leading to the reduced rear portion of the bore in the body of the torch, and an oxygen duct leading to the rear portion of the larger forward portion of the bore in the body of said torch which duct discharges into the chamber formed between the rear end of the larger portion of the tubular member and the rear end of the larger portion of the bore in the torch body.

2. In a soldering torch, a torch body provided with an axial bore, the rear portion of which is reduced in diameter, a screw seated in the rear portion of the torch body and closing the rear end of the bore therethrough, a tubular member occupying the larger portion of the bore in the torch body with its rear end seated in the forward portion of the reduced rear portion of said bore, there being an annular chamber formed between said tubular member and the rear end of the enlarged forward portion of said bore, an oxygen duct leading to said chamber a gas duct leading to the reduced rear portion of the bore in the torch body, and a tip removably positioned on the forward end of said body and surrounding the discharge end of the tubular member and the discharge end of the bore through said torch body.

3. In a soldering torch, a torch body provided with an axial bore, the rear portion of which is reduced in diameter, a screw seated in the rear portion of the torch body and closing the rear end of the bore therethrough, a tubular member occupying the larger portion of the bore in the torch body with its rear end seated in the forward portion of the reduced rear portion of said bore, there being an annular chamber formed between said tubular member and the rear end of the enlarged forward portion of said bore, an oxygen duct leading to said chamber, a gas duct leading to the reduced rear portion of the bore in the torch body, a tip removably positioned on the forward end of said body and surrounding the discharge end of the tubular member and the discharge end of the bore through said torch body, and said tip being provided with an internally arranged convex shoulder immediately adjacent to the discharge end of the bore through said torch body.

In testimony whereof I affix my signature.

LYLE N. DREIBELBIS.